United States Patent [19]

Lambeth et al.

[11] Patent Number: 5,016,160
[45] Date of Patent: May 14, 1991

[54] COMPUTER SYSTEM HAVING EFFICIENT DATA TRANSFER OPERATIONS

[75] Inventors: Shawn M. Lambeth; Lee P. Prissel; William D. Tarara, all of Rochester, Minn.

[73] Assignee: International Business Machines Corporation, Armonk, N.Y.

[21] Appl. No.: 284,958

[22] Filed: Dec. 15, 1988

[51] Int. Cl.⁵ .......................................... G06F 13/00
[52] U.S. Cl. ............................... 364/200; 364/238.3; 364/242.3; 364/254; 364/260.1; 364/263.1
[58] Field of Search ... 364/200 MS File, 900 MS File

[56] References Cited

U.S. PATENT DOCUMENTS

| | | | |
|---|---|---|---|
| 3,967,104 | 6/1976 | Brantingham et al. | 364/900 |
| 4,056,843 | 11/1977 | Bishop et al. | 364/200 |
| 4,075,688 | 2/1978 | Lynch, Jr. et al. | 364/200 |
| 4,272,815 | 6/1981 | Kadowaki et al. | 364/200 |
| 4,346,439 | 8/1982 | Huno et al. | 364/200 |
| 4,354,231 | 10/1982 | Carlsson et al. | 364/200 |
| 4,368,513 | 1/1983 | Meltzer | 364/200 |
| 4,564,903 | 1/1986 | Guyette et al. | 364/300 |
| 4,651,274 | 3/1987 | Omoda et al. | 364/200 |
| 4,901,232 | 2/1990 | Harrington et al. | 364/200 |

OTHER PUBLICATIONS

IBM System/370 Principles of Operation, Tenth Edition, May 1983, pp. 12-45 and 12-46.

Primary Examiner—Gareth D. Shaw
Assistant Examiner—Kakali Chaki
Attorney, Agent, or Firm—Curtis G. Rose; Roy W. Truelson

[57] ABSTRACT

A computer system has a system memory, a central processing unit, an input/output controller, and at least one device. When the central processing unit wants data transferred to/from system memory from/to the device, it sends Indirect DAta Address Word (IDAW) commands to the I/O controller. Instead of performing a direct memory access (DMA) operation for each IDAW command, the I/O controller starts an IDAW look ahead procedure. In this procedure, the I/O controller checks to see if the system addresses of the system memory specified in the IDAW commands are contiguous. If so, the procedure combines IDAWs that specify contiguous system addresses up to the maximum DMA transfer length. Using this procedure, the number of DMA operations sent to the system memory is minimized, and the computer system has more efficient data transfer operations.

10 Claims, 4 Drawing Sheets

1

COMPUTER SYSTEM HAVING EFFICIENT DATA TRANSFER OPERATIONS

FIELD OF THE INVENTION

This invention relates to the data processing field. More particularly, this invention is a computer system having efficient data transfer operations.

BACKGROUND OF THE INVENTION

In the operating environment of a typical 10 computer system, such as the IBM System/370, data contained in the system memory can be addressed either directly or indirectly by the computer system. Direct addressing is used by the host for program read operations. Indirect addressing is used by application and utility programs for their data read/write operations. Channel indirect data addressing permits a single channel command word (CCW) to control the transmission of data that spans noncontiguous pages in absolute system memory. Channel indirect data addressing is specified by a flag bit in the CCW which, when one, indicates that the data-address field is not used to directly address data. Instead, the contents of the data-address field specify the location of an indirect data address word (IDAW) which contains an absolute address designating a data area within system memory. IDAWs can be used for contiguous as well as noncontiguous operations, thereby having the capability to address any portion of system memory. IDAWs in the System/370 environment are described in more detail in "IBM System/370 Principles of Operation", GA22-7000-9, on pages 12-45 through 12-46, herein incorporated by reference.

In a System/370 or similar environment, the system uses IDAWs to transfer data up to a maximum transfer length. A traditional System/370 input/output controller processes these IDAWs one at a time. For each IDAW processed, a Direct Memory Access (DMA) operation must be performed. A DMA operation allows for the transfer of data between system memory and the input/output controller without processor intervention. The fact that a DMA operation must be performed each time an IDAW is processed implies that the DMA transfer length is limited by the IDAW transfer length. This can be a wasteful limitation, as performance can be improved if the number of DMA operations can be minimized.

SUMMARY OF THE INVENTION

It is a principal object of the inVention to provide a computer system having efficient data transfer operations.

It is another object of the invention to reduce the number of DMA operations in a computer system.

It is another object of the invention to process IDAWs in an efficient manner so that the number of DMA operations in the computer system is reduced.

These and other objects are accomplished by the computer system having efficient data transfer operations disclosed herein.

A computer system is disclosed which has a system memory, a central processing unit, an input/output controller, and at least one device. When the central processing unit wants data transferred to/from system memory from/to the device, it sends IDAW commands to the I/O controller. Instead of performing a direct memory access (DMA) operation for each IDAW command, the I/O controller starts an IDAW look ahead procedure. In this procedure, the I/0 controller checks to see if the system addresses of the system memory specified in the IDAW commands are contiguous. If so, the procedure combines IDAWs that specify contiguous system addresses up to the maximum DMA transfer length. Using this procedure, the number of DMA operations sent to the system memory is minimized, and the computer system has more efficient data transfer operations. Although in the preferred embodiment the computer system is an IBM System/370, this invention could be used with any computer system that uses indirect data addressing.

DESCRIPTION OF THE PREFERRED EMBODIMENTS

Figure 1:
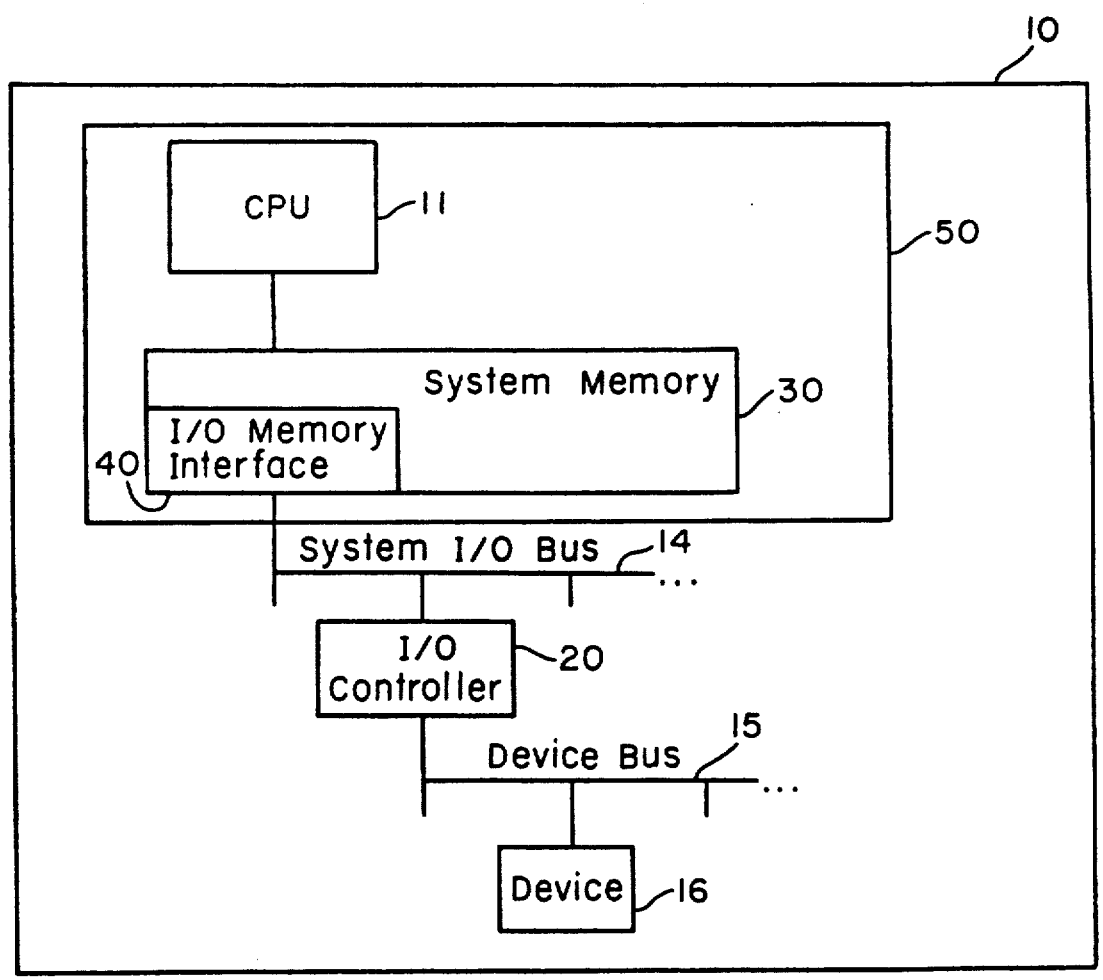
FIG. 1 shows a block diagram of the computer system of the subject invention.

FIG. 1 shows a block diagram of the computer system of the subject invention. Although in the preferred embodiment host computer 50 is an IBM System/370 with an attached I/O Controller and device, this invention could be used with any computer system that uses indirect data addressing. Computer system 10 has a central processing unit 11 connected to system memory 30. System memory 30 has I/O memory interface 40 which controls data transfer operations. I/O memory interface 40 controls the system memory accesses made by I/O controller 20 and host CPU 11, which can happen at the same time. I/O memory interface 40 is connected to I/O controller 20 over system I/O bus 14. In the preferred embodiment, I/O controller 20 is the IBM 9370 DASD/Tape Subsystem Controller, model number 6010, although I/O controller 20 could be any other controller and still fall within the scope of the invention. I/O controller 20 is shown in more detail in FIG. 2. Although FIG. 1 shows only one I/O controller connected to system I/O bus 14, several I/O controllers could actually be connected.

Still referring to FIG. 1, I/O controller 20 is connected to device 16 via device bus 15. Device 16 in the preferred embodiment is a DASD unit, such as the IBM 9332 or 9335, or a tape unit, such as the IBM 9347. In addition, device 16 could be a printer, a display, a plotter, or any other type of device that accesses system memory 30. Although FIG. 1 shows only one device connected to device bus 15, several devices could actually be connected.

Figure 2:
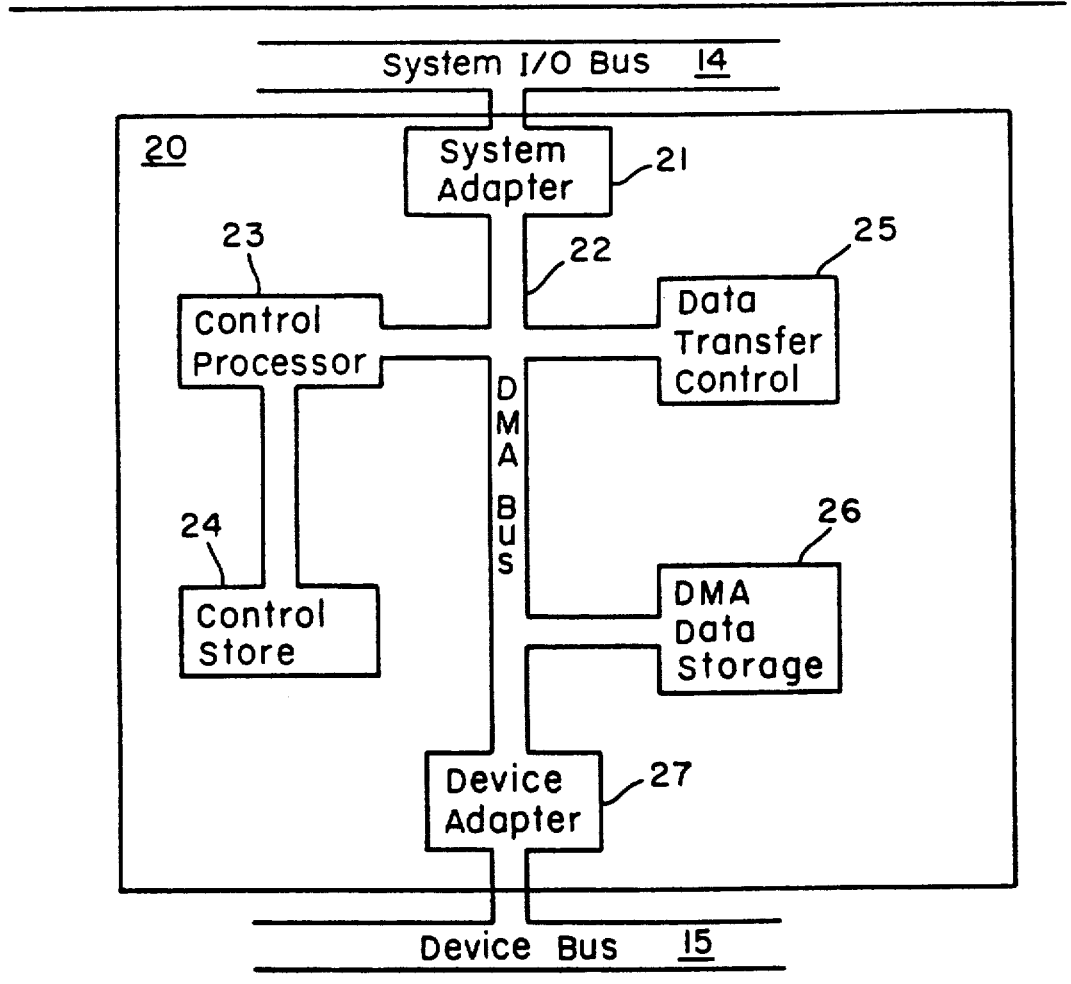
FIG. 2 shows a block diagram of the input/output controller of the subject invention.

FIG. 2 shows a block diagram of input/output controller 20 of the subject invention in more detail. System adapter 21 is connected to system I/O bus 14 and DMA bus 22. System adapter 21 provides the interface functions required to transfer data and commands between host computer 50 and I/O processor 20 via system I/O bus 14. DMA bus 22 connects system adapter 21 with control processor 23, control store 4, data transfer control 25, DMA data storage 26, and device adapter 27.

Control processor 23 is responsible for performing the basic functions of I/O controller 20 by executing the microcode instructions residing in control store 24. Control store 24 contains the microcode which controls I/O processor 20 and which provides the functions necessary to execute the data transfer operations of the invention. Data transfer control 25 coordinates the data transfer or DMA functions between system adapter 21, DMA data storage 26 and device adapter 27 via DMA bus 22. DMA data storage 26 is used as a data buffer during DMA operations. Device adapter 27 is connected to device bus 15, and provides the interface functions required to transfer data and commands between I/O controller 20 and device 16.

Figure 3:
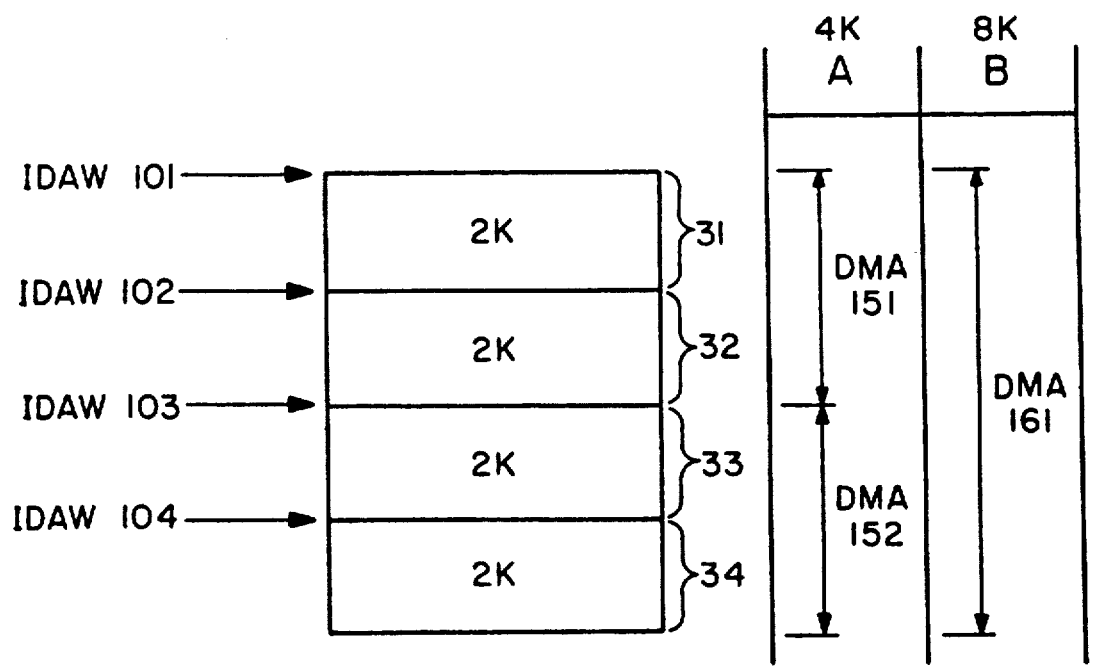
FIG. 3 shows how several indirect data address word commands from a device specifying contiguous system addresses are combined in the subject invention into one direct memory address operation.

FIG. 3 shows how several indirect data address word commands from CPU 11 specifying contiguous system addresses are combined in the subject invention into one direct memory address operation. In the preferred embodiment, when CPU 11 sends an IDAW command to I/O controller 20, the IDAW command can be any length up to a maximum of 2K bytes. Note that this maximum IDAW transfer length can be more or less than 2K bytes and still fall within the scope of the invention. Assume that CPU 11 sends four IDAW commands 101-104 to I/O controller 20, each of which has a length of 2K bytes. IDAW 101 specifies system address 31 of system memory 30. IDAW 102 specifies system address 32, contiguous to system address 31 of system memory 30. Likewise, system address 33 specified in IDAW 103 is contiguous with system memory 32 specified in IDAW 102, and system address 34 specified in IDAW 104 is contiguous with system memory 33 specified in IDAW 103.

In the preferred embodiment, computer system 10 has a maximum DMA transfer length of 4K bytes. This is shown in column A of FIG. 3. When I/O controller 20 performs the IDAW look ahead procedure as described later, IDAW 101 and IDAW 102 are combined into DMA operation 151, and IDAW 103 and IDAW 104 are combined into DMA operation 152. The number of DMA operations required to handle IDAWs 101-104 is reduced from four to two in the preferred embodiment as shown in column A of FIG. 3. Column B of FIG. 3 shows an alternate embodiment where computer system 10 has a DMA transfer length of 8K bytes. Here, IDAWs 101-104 are combined into a single DMA operation, DMA operation 161. The number of DMA operations required to handle IDAWs 101-104 is reduced from four to one in the alternate embodiment as shown in column B of FIG. 3. Note that the DMA transfer length can be quite large, such as 256K bytes or more, and still fall within the scope of the invention.

Figure 4:
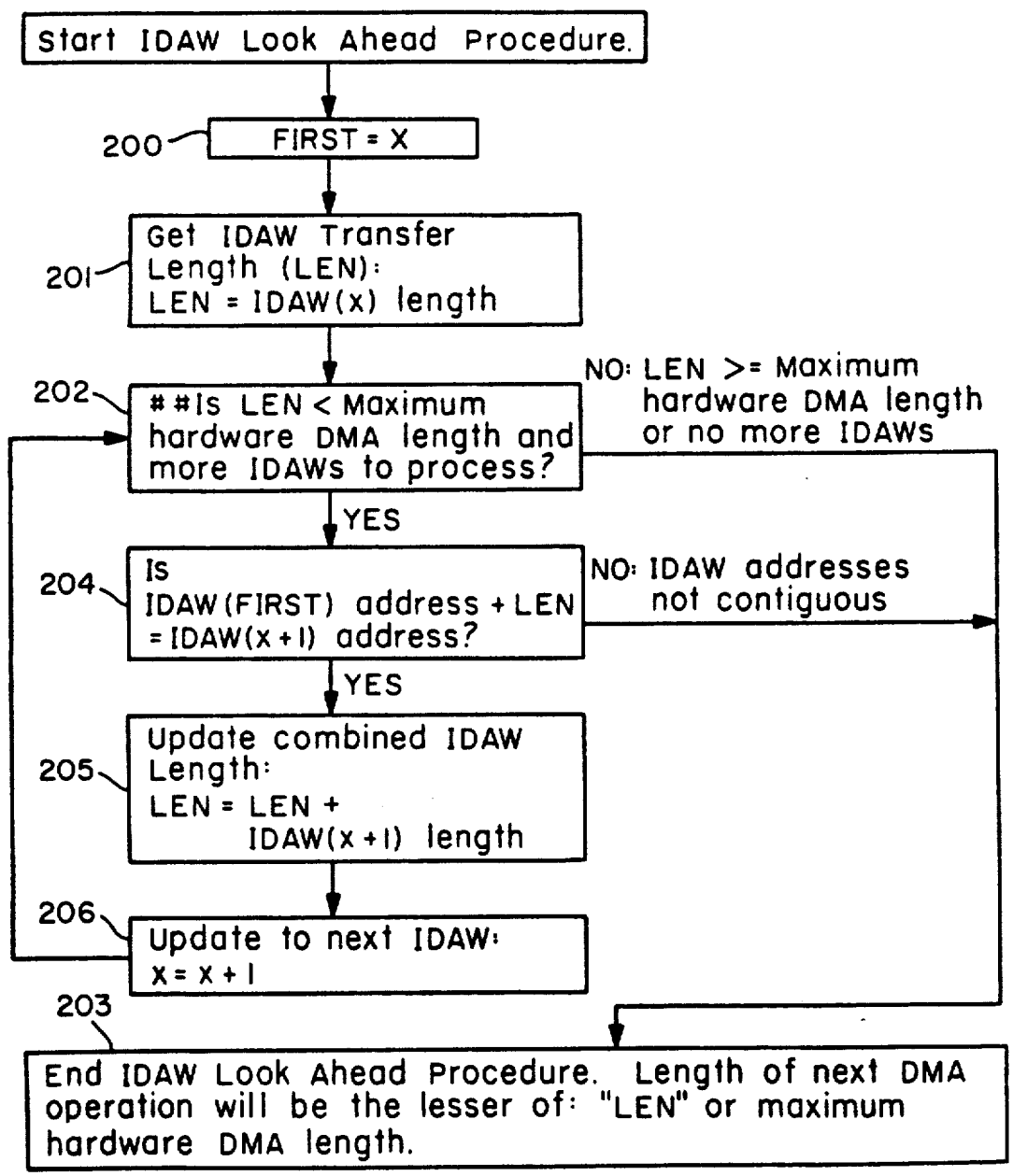
FIG. 4 shows the indirect data address word look ahead procedure of the subject invention.

FIG. 4 shows the indirect data address word look ahead procedure of the subject invention. In the preferred embodiment, the IDAW look ahead procedure is performed by control processor 23 by executing microcode instructions residing in control store 24. An alternate embodiment could have the IDAW look ahead procedure performed in hardware by data transfer control block 25 of I/O controller 20. When CPU 11 sends the first IDAW command (IDAW(x)) to I/O controller 20, the IDAW look ahead procedure sets First =X in block 200 and sets the value LEN equal to the length of IDAW(x) in block 201. Block 202 checks to see if LEN is less than the maximum DMA transfer length and if there are more IDAWs to process. In the preferred embodiment, this maximum DMA transfer length is 4K bytes, although this could vary depending on the computer system used. For example, the maximum DMA transfer length of the alternate embodiment discussed previously in conjunction with column B of FIG. 3 was 8K bytes.

If LEN is greater than or equal to the maximum DMA transfer length, or if there are no more IDAWs to process, the IDAW look ahead procedure ends in block 203. The length of the next DMA operation between I/O processor 20 and I/O memory interface 40 will be the lesser of LEN or the maximum DMA transfer length. If LEN is less than the maximum DMA transfer length and there are more IDAWs to process, the procedure continues in block 204. Block 204 looks ahead to the next IDAW command sent to I/O controller 20 from CPU 11 (IDAW(x+1)) and checks to see if the two IDAW addresses are contiguous. This is done by adding the IDAW(FIRST) address to LEN and checking to see if this sum equals the IDAW(x+1) address. If not, the IDAW look ahead procedure ends in block 203, and the length of the next DMA operation sent to system memory 30 will be the lesser of LEN or the maximum DMA transfer length.

If block 204 determines that the two IDAW addresses are contiguous, the IDAW commands are combined into a single operation. This is done by adding the length of IDAW(x+1) to LEN. Block 205 updates to the next IDAW by making x=x +1, and the procedure loops back to block 202. Block 202 and blocks 204-206 are repeated as long as IDAWs specifying contiguous system memory addresses can be combined without exceeding the maximum DMA transfer length. When either of these two events happen, or when there are no more IDAWs to process, the procedure ends in block 203, and the length of the next DMA operation sent to system memory 30 will be the lesser of LEN or the maximum DMA transfer length.

IDAWs are often used for paging operations which span non-contiguous memory. More than one IDAW will be required for system pages greater than maximum IDAW transfer length. Using the teachings of this invention, IDAWs can be combined up to the page size and sent to the system memory in one DMA operation. This is a key advantage of the invention since, if for example a system page was 4K, this invention would always combine at least 2 IDAWs for every page in an efficient manner.

While the invention has been described with respect to preferred and alternate embodiments, it will be understood by those skilled in the art that various changes in detail may be made therein without departing from the spirit, scope and teaching of the invention. Accordingly, the herein disclosed is to be limited only as specified in the following claims.

What is claimed is:

1. A computer system having efficient data transfer operations, comprising:
 a system memory having system addresses;
 a central processing unit connected to said system memory;
 means for receiving a plurality of indirect data address word commands from said central processing unit;
 means for combining said plurality of indirect data address word commands to form a lesser number of combined indirect data address word commands if the system addresses specified in said indirect data address word commands are contiguous; and means for transmitting data between said system memory specified by said combined indirect address word commands and another component of said computer system.

2. The computer system of claim 1, further comprising:
means for stopping said combining means when the length of said combined indirect data address word commands exceeds a predetermined direct memory address transfer length.

3. The computer system of claim 1, further comprising means for stopping said combining means when there are no more indirect data address word commands to process.

4. The computer system of claim 1, wherein said means for transmitting data transmits data between said system memory specified by said combined indirect address word commands and an input/output controller.

5. The computer system of claim 4, wherein said input/output controller controls one or more direct access storage device units.

6. The computer system of claim 4, wherein said input/output controllers controls one or more tape unit devices.

7. An input/output controller, for connecting to a system memory having system addresses and to a central processing unit, said input/output controller comprising:
means for receiving a plurality of indirect data address word commands from said central processing unit;
means for combining said plurality of indirect data address word commands to form a lesser number of combined indirect data address word commands if the system addresses specified in said indirect data address word commands are contiguous; and
means for transmitting data between said input/output controller and said system memory specified by said combined indirect address word commands.

8. A method of data transfer in a computer system having a system memory, a central processing unit connected to said system memory, an input/output controller connected to said system memory, said system memory having system addresses, said method comprising the steps of:
said input/output controller receiving a plurality of indirect data address word commands from said central processing unit;
said input/output controller combining said plurality of indirect data address word commands to form a lesser number of combined indirect data address word commands if the system addresses specified in said indirect data address word commands are contiguous; and
said input/output controller transmitting data between said input/output controller and said system memory specified by said combined indirect address word commands.

9. The method of claim 8, further comprising the step of:
stopping said combining step when the length of said combined indirect data address word commands exceeds a predetermined direct memory address transfer length.

10. The method of claim 8, further comprising the step of:
stopping said combining step of when there are no more indirect data address word commands to process.

* * * * *